Figure 1:
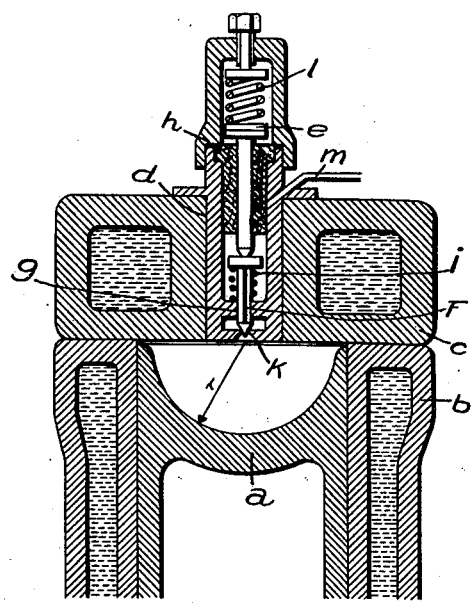

Patented Nov. 1, 1932

1,885,719

UNITED STATES PATENT OFFICE

VICTOR HEIDELBERG, OF BENSBERG, NEAR COLOGNE, GERMANY, ASSIGNOR TO MOTORENFABRIK DEUTZ, AKTIENGESELLSCHAFT, OF COLOGNE-DEUTZ, GERMANY

COMBUSTION CHAMBER FOR INTERNAL COMBUSTION ENGINES

Application filed April 23, 1929. Serial No. 357,461.

This invention relates to internal combustion engines, and more particularly to Diesel engines of the type in which the fuel charge is injected into the cylinder without the aid of compressed air.

In order to obtain complete combustion of the whole of the air in the combustion chamber with the fuel, it is important that the particles of the fuel jet should be able to penetrate throughout the whole of the combustion space and reach even the air particles which are adjacent to the uttermost wall of the combustion chamber. As the air within the combustion chamber is compressed to 25–35 atms., this offers considerable resistance to the passage of the fuel jet. It is therefore important that, in order to secure the required penetration, the velocity of the particles of fuel of the jet should not be lessened by the formation of eddy or other currents.

One of the objects of the invention therefore, is to provide an engine of the kind stated, the piston of which is provided with a curved recess constituting the combustion chamber of the engine, the center of said curved recess being substantially at the outlet of the fuel nozzle, the combustion chamber being limited at the top by the plane or flat undersurface of the cylinder head. Another object of the invention is to provide an engine of the kind stated, the piston of which is provided with a curved recess constituting the combustion chamber of the engine, the combustion chamber being limited at the top by the plane or flat undersurface of the cylinder head, and in which the air is introduced into said combustion chamber in a direction substantially parallel to the longitudinal axis of the cylinder.

The path of all portions of the jet to the surface of impact throughout the combustion chamber is thus of substantially the same length, and the fuel as it gradually passes into the form of mist uniformly penetrates through the quiescent air in the combustion chamber up to the walls of the combustion chamber.

These and other aims and objects of the invention will best be understood from the following description taken in connection with the accompanying drawing of one illustrative embodiment of the invention, the scope of the invention being more particularly brought out in the appended claim.

Figure 2:
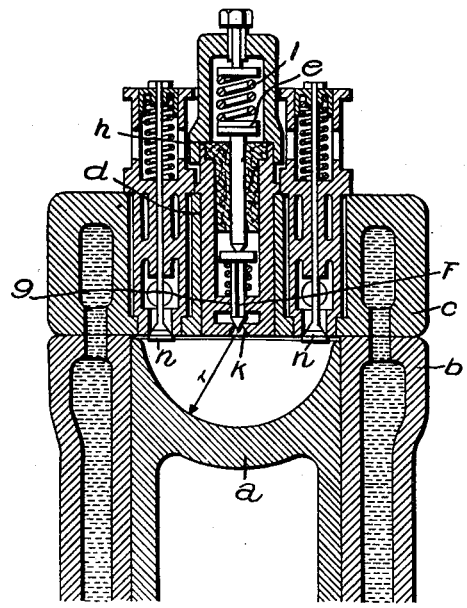

In the drawing:

Figure 1 is a vertical sectional view of one illustrative embodiment of the invention, and Fig. 2 is a section through the cylinder and cylinder head showing conventional exhaust and air intake valves.

Referring now to Fig. 1, $a$ denotes the piston, $b$ the cylinder body, $c$ the cylinder head and $d$ the body of the fuel injection nozzle. Mounted in the nozzle body is a needle valve $f$ slidable in a guide $g$ and an actuating rod $e$ slidable in a guide $h$. The rod $e$ is placed under the action of a relatively strong spring $l$ which holds the rod $e$ pressed by its lower end against the needle valve $f$, thus holding the later on its seat $k$ when no fuel is admitted into the nozzle. The supply of the fuel takes place by the pipe $m$ coming from the fuel pump, not shown. A weak spring $i$ surrounding the needle valve $f$ tends to lift the valve from its seat $k$ and causes it to follow always immediately the movements of the actuating rod $e$. Exhaust and air intake valves $n, n$ are illustrated in Fig. 2. It will be seen that the air intake valve is so disposed that the air is introduced into the combustion chamber in a direction substantially parallel to the longitudinal axis of the cylinder. These valves may be of any conventional well known construction, and may be operated at suitable times in the cycle of operation of the engine by any suitable mechanism and in any manner well known in the art, so that any further description of their construction and mode of operation would be superfluous.

In engines of the present type run by airless injection the described peculiar shape of the piston having a deep curved recess in its head considerably aids in obtaining a perfect combustion. I have been led to use this peculiar shape of piston by the following observation: A jet of liquid which is injected under high pressure into a gas-filled room, has to move for a certain distance in order to allow spray particles to separate from the jet. The jet of spray will then evade obstacles in space, similar to a gas current, producing eddies. The deeply recessed curved piston described, answers these stereometrical conditions in the most favorable manner. Tests made with flat and more or less recessed pistons have proved that the combustion was the more favorable the deeper the piston was recessed.

I am aware that pistons with a deep curved recess in their head have already been used in Diesel engines in which the fuel is injected by the aid of compressed air. With those engines, however, the recess of the piston has no influence on the atomization of the fuel since same is produced by the compressed air alone. The recess in the piston head of Diesel engines is only provided to the end of obtaining a high cooling effect, the recess serving to afford a large heat interchange surface to the piston cooling medium which is indispensable with engines of that type. This means that, with the subject matter of the present invention, the recess in the piston head serves other purposes and produces new effects over the piston forms used hitherto in engines operated by fuel injected through compressed air.

In the deep piston recess according to the present invention there is created a hot core of quiescent air into which the fuel is injected by the nozzle so as to distribute uniformly in the combustion space. While the larger part of the fuel injected will be vaporized on its way from the nozzle through the combustion space, part of it will reach the piston head in a non-vaporized condition and be vaporized there, absorbing heat from the piston. Thus, the necessary cooling of the combustion chamber is effected by the fuel itself, while in the well-known engines the cooling of the piston is effected by cooling water which entails a loss of heat. In addition, the vaporization and combustion of the fuel is greatly favored by the fact that, owing to the distinct hemispherical shape of the piston recess with its center at a point near the nozzle mouth, all fuel rays must make ways of equal lengths in the combustion space so that they have the same time for vaporization and ignition. The consumption of the fuel is a very low one in view of the favorable conditions of vaporization and combustion afforded by the described arrangement of the combustion chamber.

The invention is fully distinguished from those constructions in which the piston is formed with a hemisphercal concavity but means are provided to cause the air in the combustion chamber to be set into rotary motion, since one of the characteristic features of the present invention is that the air in the combustion chamber is in a quiescent state at the time of the fuel injection, so that the fuel passes through a mass of quiescent air.

In the construction according to the invention the cooled upped surface of the cylinder cover is as small as possible, thus increasing the efficiency of combustion. Also eddies that would normally arise in the space formed at the end of the piston stroke are avoided which is an advantage, as these eddies have the effect of preventing the sprayed fuel particles from effectively mixing with the air particles.

This application is a continuation-in-part of my application Serial No. 20,225, filed April 2, 1925.

I claim:

An internal combustion engine having, in combination, a cylinder, a piston therein, the upper face of the latter formed to provide a deep hemispherical recess the surface of which is coaxial with said piston, a cylinder head the under surface of which coacts with the surface of said recess to form a substantially smooth-walled chamber symmetrical with the axis of said cylinder, means for injecting fuel oil under high pressure into said cylinder including a fuel injection nozzle coaxial with said piston, the center of curvature of the surface of said hemispherical recess being substantially at the mouth of said nozzle, an air inlet valve for injecting air into said cylinder longitudinally thereof to avoid whirling, said means for injecting fuel oil being timed to inject said oil into said cylinder after said air inlet valve has closed and the air in said cylinder is highly compressed and quiescent, whereby said fuel oil is injected into a hot core of quiescent air, and the fuel rays are caused to travel through said air without deflection so as to travel equal distances toward the walls of said recess.

In testimony whereof, I have signed my name to this specification.

VICTOR HEIDELBERG.